April 5, 1927. 1,623,308
J. DEMAND
WINDSHIELD WIPER
Filed June 7, 1921 2 Sheets-Sheet 1
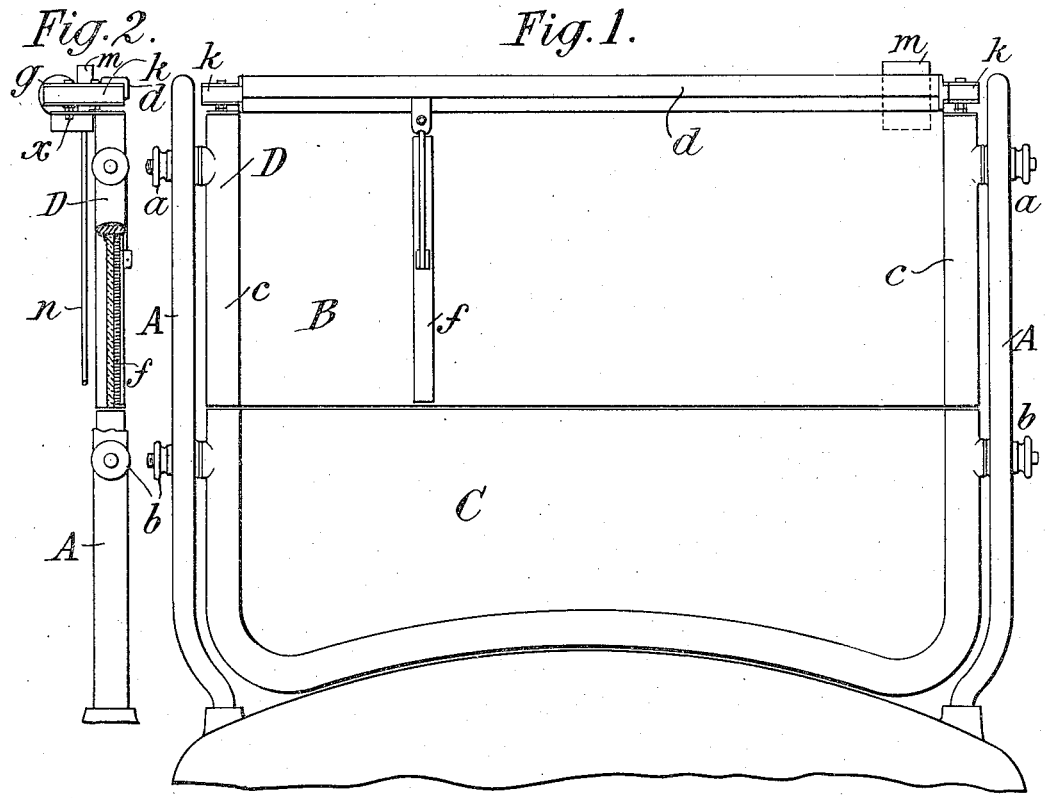
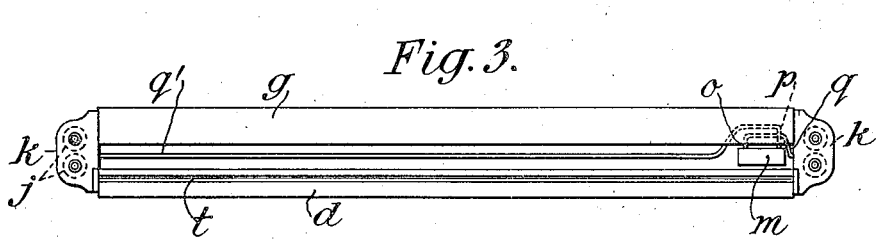
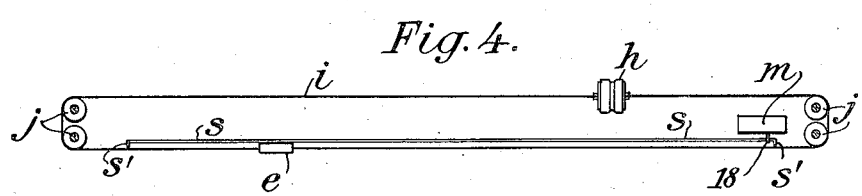
Inventor
Joseph Demand,
By his Attorneys
Fraser, Turk & Myers.

Patented Apr. 5, 1927.

1,623,309

UNITED STATES PATENT OFFICE.

LOUIS GEORGE ECONOM, OF NORTH PLAINFIELD, NEW JERSEY.

PORTABLE RECIPROCATING POWER SAW.

Application filed October 7, 1924. Serial No. 742,120.

This invention relates to saws and more particularly is directed to an improved portable reciprocating power saw.

Among the objects of the invention there is provided a device of the character described with novel means for automatically feeding the saw blade relative to the work during the cutting operation, said means including an improved, universally adjustable member secured to the casing of the saw and adapted to rest on work for setting the saw to cut at various angles with respect to said member and the work.

Another object of the invention is to provide a practical device of the character described which is constructed of few and simple parts, is easy to adjust and operate, relatively inexpensive to manufacture, and efficient in operation to a high degree.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention;

Fig. 1 is a plan view of a saw embodying the invention with parts broken away to expose the interior;

Fig. 2 is a front elevational view corresponding to Fig. 1 with parts broken away to show the interior construction;

Fig. 3 is a cross-sectional view taken on line 3—3 of Fig. 1; and

Fig 4 is a cross-sectional view taken on line 4—4 in Fig. 2.

Referring in detail to the drawing, 10 denotes a casing comprising a supporting frame 10$^a$ and a front side cover 10$^b$ for carrying and enclosing a reciprocating drive mechanism for a saw embodying the invention, said casing being preferably made of metal, such as cast aluminum or the like material. A suitable handle 11 may be provided at the rear end of the casing 10 over which may be mounted a power unit such as an electric motor 12 provided with a finger operated control switch 12$^a$ on handle 11. The front end portion of the casing 10 may be constructed to support and guide the saw blade 13 which is arranged to pass into the casing 10 through a front opening 10$^c$.

Any suitably designed reciprocating drive mechanism for the blade 13 may be provided. The one shown in the drawing is seen to include a speed reduction gearing consisting of a pinion 14 meshing with a gear wheel 15, the pinion 14 being secured to be driven by the motor 12 and the wheel 15 being mounted to drive a horizontally extending shaft 16 which is journaled in a suitable bearing provided by an upwardly extending portion 10$^d$ of casing 10 adjacent the motor 12 as shown in Fig. 2. To change the rotary driving motion to a reciprocating motion, the front end of shaft 16 is provided with a balanced crank arm 18 on which a crank pin 19 is secured, and the latter is arranged to engage with a cross-head piece 20 which is adapted to reciprocate transversely in an oscillating slotted guide member 21.

A bell crank 22 pivotally mounted on an overhanging bearing bolt 23 which is mounted on an upwardly extending portion 10$^e$ of casing 10 has a short rearwardly extending arm 22$^a$ which is provided with a bifurcated end 22$^b$ for supporting the guide member 21 and a long downwardly extending arm 22$^c$ which is provided with a slotted opening 22$^d$ to serve as a guide for a cross head piece 24 as shown in Fig. 2. Engaging with said piece 24 to reciprocate the saw blade 13 is a wrist-pin 25 which is secured to the side of a rearwardly extending portion 13$^a$ of said saw, said latter portion 13$^a$ being provided with an upper and lower guiding edge strip 26 and 27 respectively. Preferably each of said strips are releasably secured to the saw blade 13 by suitable fastening means such as screws 28, and the upper strips 26 may have a toothed rack 26$^a$ formed thereon for the purpose hereinafter to appear.

The front vertically extending edge portions 10$^f$ and 10$^h$ of the frame 10$^a$ and the cover 10$^b$ respectively form the side walls of the opening 10$^c$ through which saw blade 13 passes, and said portion 10$^f$ and 10$^h$ may be provided with grooves 10$^i$ for receiving suitable resilient absorbent liners 29 such as felt or the like material, which are arranged to contact with the sides of the saw blade 13 for preventing the vibration of said saw blade. The liners 29 also serve as a lubricating distributing means and as a guard to

I claim:

A demountable rim having the adjacent ends correspondingly beveled, an expansion bolt pivoted to said rim adjacent one end thereof, a pair of lugs on the other end of the rim adapted to receive said bolt between them, a nut on said bolt impinging against said lugs, said lugs being provided with transverse notches, and a bar on said bolt resting in said notches and held therein by said nut, substantially as described.

In testimony whereof I have signed my name to this specification.

ROBERT C. COLEMAN.

to releasably urge the feed screw 34 into engagement with the threaded end 40ª of the carrier 40.

For limiting the movement of the yoke member 31 an arcuate slot 49 is provided therein to receive a screw 50 threaded into the casing 10 as shown in Fig. 1, said slot and screw serving to stop the feed screw 34 when in proper operating engagement with the carrier. A suitable spring actuated latch member 51 may be pivotally mounted on the exterior side of the casing frame 10ª to engage with the stretcher rod 31ᶜ of the yoke member 31 for releasably holding the feed screw 34 in its disengaged position, when it is desired to use the saw without the feeding means.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:—

1. A portable power saw of the character described comprising a casing, a saw blade mounted thereon for reciprocating movement, and a guide rest support slidably mounted to move with respect to the casing for feeding the saw blade during the cutting operation.

2. A portable power saw of the character described comprising a casing, a saw blade mounted thereon for reciprocating movement, a guide rest support slidably mounted to the casing and means actuated by the reciprocating motion of the saw blade for moving said support with respect to the casing for feeding the saw blade during the cutting operation.

3. In a portable device of the character described, a casing, a saw blade mounted thereon for reciprocating movement and a guide rest support movably secured to the casing, and means connecting with the saw blade to intermittently move the said support with respect to the saw blade for feeding the latter during the cutting operation, said means including a rack secured to the saw blade, a gear wheel meshing with the rack, and a feed screw having a ratchet and pawl connection with said wheel for raising the said support.

4. In a portable device of the character described, a casing, a saw blade mounted thereon for reciprocating movement and a guide rest support movably secured to the casing, and means for moving the said support with respect to the casing for feeding the saw blade during the cutting operation, said means including a feed screw and carrier member co-operatingly engaging with said screw for raising the said support and a rack and pinion for actuating said screw by the reciprocating motion of the saw blade.

5. In a portable device of the character described, a casing, a saw blade mounted thereon for reciprocating movement and a guide rest support movably secured to the casing, and means for moving the said support with respect to the casing for feeding the saw blade during the cutting operation, said means including a carrier member actuated by the reciprocating motion of the saw blade for raising the said support, and a guideway for the carrier fixed to the casing.

6. In a portable device of the character described, a casing, a saw blade mounted thereon for reciprocating movement and a guide rest support movably secured relative to the casing, and actuated by the reciprocating motion given the saw blade adapted to feed the latter during the cutting operation, and a universally adjustable means for setting the said support to various angles with respect to the saw blade.

7. In a portable device of the character described, a casing, a saw blade mounted thereon for reciprocating movement and a guide rest support movably secured relative to the casing, and actuated by the reciprocating motion given the saw blade, adapted to feed the latter during the cutting operation and a universally adjustable double swivel for setting the said support to various angles with respect to the saw blade, said means having an indicating scale to facilitate the setting of said support to any desired angle.

8. In a portable device of the character described, a casing, a saw blade mounted thereon for reciprocating movement and a guide rest support movably secured to the casing, and means connecting with the saw blade to move the said support with respect to the saw blade for feeding the latter during the cutting operation, said means including a feed screw actuated by the reciprocating motion given the saw blade, a carrier member co-operatingly engaging with said screw, and an adjustable double swivel coupling means connecting said carrier member with said support.

9. In a portable device of the character described, a casing, a saw blade mounted thereon for reciprocating movement and a guide rest support movably secured to the casing, and means connecting with the saw blade to move the said support with respect to the saw blade for feeding the latter during the cutting operation, said means including a feed screw actuated by the reciprocating motion given the saw blade; a carrier member co-operatingly engaging with said screw, and a universally adjustable coupling means having a double pivoted connection with the carrier member and with the said support to permit setting the saw blade for cutting at various angles with respect to the support.

10. In a portable device of the character described, a casing, a saw blade mounted thereon for reciprocating movement, a guide rest support movably secured to the casing, a double swivel connection for mounting said support, and means actuated by the reciprocating motion given the saw blade to intermittently move the said support with respect to the saw blade for feeding the latter during the cutting operation, and indicating scales positioned adjacent said connections to facilitate the said setting.

11. A portable power saw comprising a casing, a saw blade mounted thereon for reciprocating movement, a guide rest support secured to the casing, means actuated by the saw blade for moving said support with respect to the casing for feeding the saw blade during the cutting operation, and means for automatically making said actuating means ineffective, said means being disengageably connected with the actuating means to permit quick resetting of the support.

12. A portable power saw comprising a casing, a saw blade mounted thereon for reciprocating movement, a guide rest support secured to the casing, means actuated by the saw blade for moving said support with respect to the casing for feeding the saw blade during the cutting operation, and means effective at limit of movement of said support for making said actuating means inoperative.

13. In a portable device of the character described, a casing, a saw blade mounted thereon for reciprocating movement and a guide rest support movably secured to the casing, and means for moving the said support with respect to the casing for feeding the saw blade during the cutting operation, said means including a fed screw and a carrier member actuated by the screw for raising the support, the engaging of said screw and carrier being inoperative at the limit of movement of said member.

In testimony whereof I affix my signature.

LOUIS GEORGE ECONOM.

Certificate of Correction.

Patent No. 1,623,309. Granted April 5, 1927, to

LOUIS GEORGE ECONOM.

It is hereby certified that error appears in the printed specification of the above-numbered patent requiring correction as follows: Page 4, line 49, claim 13, for the word "fed" read *feed;* and that the said Letters Patent should be read with this correction therein that the same may conform to the record of the case in the Patent Office.

Signed and sealed this 26th day of April, A. D. 1927.

[SEAL.]
M. J. MOORE,
*Acting Commissioner of Patents.*